(12) United States Patent
Li

(10) Patent No.: US 12,512,125 B2
(45) Date of Patent: Dec. 30, 2025

(54) DUBBING INTERACTION METHOD AND APPARATUS, COMPUTER DEVICE, AND STORAGE MEDIUM

(71) Applicant: Beijing Zitiao Network Technology Co., Ltd., Beijing (CN)

(72) Inventor: Xuhua Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/783,348

(22) Filed: Jul. 24, 2024

(65) Prior Publication Data

US 2025/0061920 A1    Feb. 20, 2025

(30) Foreign Application Priority Data

Aug. 15, 2023   (CN) .......................... 202311028925.2

(51) Int. Cl.
*G11B 27/02*  (2006.01)
*G06F 3/0483* (2013.01)
*G06F 3/16*   (2006.01)

(52) U.S. Cl.
CPC ............ *G11B 27/02* (2013.01); *G06F 3/0483* (2013.01); *G06F 3/165* (2013.01)

(58) Field of Classification Search
CPC ........ G11B 27/02; G06F 3/0483; G06F 3/165
See application file for complete search history.

(56) References Cited

U.S. PATENT DOCUMENTS

| 12,101,516 B1* | 9/2024 | Theckyam | G06F 40/58 |
| 2011/0239119 A1* | 9/2011 | Phillips | G06F 3/0482 |
| | | | 715/731 |

(Continued)

FOREIGN PATENT DOCUMENTS

| CN | 107659850 A | 2/2018 |
| CN | 107809666 A | 3/2018 |
| CN | 112261435 A | 1/2021 |

(Continued)

OTHER PUBLICATIONS

China Patent Application No. 202311028925.2; Office Action; dated Jun. 27, 2025; 24 pages.

*Primary Examiner* — Thai Q Tran
*Assistant Examiner* — Jose M Mesa
(74) *Attorney, Agent, or Firm* — BakerHostetler

(57) ABSTRACT

A dubbing interaction method and an apparatus, a computer device, and a storage medium are provided. The method includes: showing character information associated with a text to be dubbed; in response to a selection operation for first character information, obtaining a first dubbing audio of a first user, and associating the first dubbing audio with the first character information, wherein the first dubbing audio is a dub for a text fragment of the text to be dubbed that is associated with the first character information; and obtaining an aggregated dubbing audio corresponding to the text to be dubbed based on the first dubbing audio associated with the first character information and an obtained second dubbing audio respectively corresponding to second character information associated with the text to be dubbed, and showing a first audio identifier corresponding to the aggregated dubbing audio.

20 Claims, 6 Drawing Sheets

(56) References Cited

U.S. PATENT DOCUMENTS

2020/0258495 A1* 8/2020 Arquette ................. G10L 13/00
2025/0210065 A1* 6/2025 Gulati .................... G10L 25/90

FOREIGN PATENT DOCUMENTS

| CN | 114693827 A | 7/2022 |
| CN | 114783403 A | 7/2022 |
| CN | 115037975 A | 9/2022 |
| CN | 116264073 A | 6/2023 |

* cited by examiner

DUBBING INTERACTION METHOD AND APPARATUS, COMPUTER DEVICE, AND STORAGE MEDIUM

CROSS-REFERENCE TO RELATED APPLICATION

This application claims priority to Chinese Patent Application No. 202311028925.2, filed on Aug. 15, 2023, the entire disclosure of which is incorporated herein by reference as part of the present disclosure.

TECHNICAL FIELD

The present disclosure relates to a dubbing interaction method and a dubbing interaction apparatus, a computer device, and a storage medium.

BACKGROUND

In a book reading application, if a user is relatively interested in some contents, the user may want to dub for and share them. In this case, a user dubbing function may be provided in such an application, allowing a user to dub for contents in a book that the user is reading, thereby enhancing the interactive experience of the user.

A general user dubbing function only allows users themselves to dub for selected characters without interaction, and thus cannot provide good dubbing experience.

SUMMARY

Embodiments of the present disclosure provide a dubbing interaction method, comprising: showing a plurality of pieces of character information associated with a text to be dubbed; in response to a selection operation for first character information shown, obtaining a first dubbing audio of a first user, and associating the first dubbing audio with the first character information, wherein the first dubbing audio is a dub for a text fragment of the text to be dubbed that is associated with the first character information; and obtaining an aggregated dubbing audio corresponding to the text to be dubbed based on the first dubbing audio associated with the first character information and an obtained second dubbing audio respectively corresponding to at least one piece of second character information associated with the text to be dubbed, and showing a first audio identifier corresponding to the aggregated dubbing audio, wherein the first audio identifier indicates character information corresponding to each dubbing audio in the aggregated dubbing audio.

In an embodiment, the first audio identifier comprises audio playing identifiers of dubbing audios corresponding to a plurality of text fragments; and an arrangement order of the audio playing identifiers in the first audio identifier is related to a contextual order of the plurality of text fragments in the text to be dubbed.

In an embodiment, the dubbing interaction method further comprises: obtaining the second dubbing audio respectively corresponding to the at least one piece of second character information associated with the text to be dubbed, comprising: posting dubbing dynamic information of the first user, wherein the dubbing dynamic information comprises the first dubbing audio associated with the text to be dubbed; and obtaining the second dubbing audio corresponding to the at least one piece of second character information fed back by a second user based on the dubbing dynamic information.

In an embodiment, the dubbing interaction method further comprises: obtaining the second dubbing audio respectively corresponding to the at least one piece of second character information associated with the text to be dubbed, comprising: in response to an intelligent dubbing request, obtaining the second dubbing audio generated based on artificial intelligence and respectively corresponding to the at least one piece of second character information associated with the text to be dubbed.

In an embodiment, showing the plurality of pieces of character information associated with the text to be dubbed comprises: in response to a dubbing triggering operation for the text to be dubbed, showing a chat interface of a target virtual room, wherein the plurality of pieces of character information associated with the text to be dubbed are shown in the chat interface.

In an embodiment, after obtaining the first dubbing audio, the dubbing interaction method further comprises: in response to obtaining a target dialect type selected by the first user, converting the first dubbing audio to a dubbing audio of the target dialect type; or showing a recommended dialect type according to geographical location information of the first user obtained under authorization or geographical location information contained in the text to be dubbed; and converting the first dubbing audio to a dubbing audio of the recommended dialect type in response to a confirmation operation for the recommended dialect type.

In an embodiment, the dubbing interaction method further comprises: for at least one audio distribution scenario, determining an aggregated dubbing audio associated with target theme information in the audio distribution scenario according to plot or character information associated with the target theme information; and associatively showing a first audio identifier corresponding to the aggregated dubbing audio under the target theme information shown, wherein the first audio identifier is used to show text information and an audio playing identifier corresponding to each dubbing audio of the aggregated dubbing audio in response to a first triggering operation, and a corresponding dubbing audio is played after any audio playing identifier is triggered.

In an embodiment, the dubbing interaction method further comprises: determining the text to be dubbed, comprising: showing a plurality of fragment dimensions associated with a target book, wherein each of the plurality of fragment dimensions is used to indicate a text fragment in the target book that matches a preset attribute feature; and in response to a target fragment dimension being selected by the first user, determining a text in the target book that matches the target fragment dimension as the text to be dubbed.

In an embodiment, the dubbing interaction method further comprises: in response to a dub viewing request for a target book, obtaining and showing dub aggregation information associated with the target book, wherein the dub aggregation information comprises a plurality of fragment dimensions, and a first audio identifier, associated with each of the plurality of fragment dimensions, of an aggregated dubbing audio; each of the plurality of fragment dimensions is used to indicate a text fragment in the target book that matches a preset attribute feature; the plurality of fragment dimensions comprise at least two of a popularity dimension, a target character dimension, and a target plot dimension; and wherein the first audio identifier is used to successively play dubbing audios of the aggregated dubbing audio under the plurality of fragment dimensions in response to a second triggering operation, or after any audio playing identifier in the first audio identifier is triggered, a dubbing audio of a text fragment corresponding to the audio playing identifier is played.

Embodiments of the present disclosure further provide a computer device, comprising: a processor and a memory, wherein the memory stores machine-readable instructions executable by the processor; the machine-readable instructions, when executed by the processor, cause a dubbing interaction method to be performed, and the dubbing interaction method comprises: showing a plurality of pieces of character information associated with a text to be dubbed; in response to a selection operation for first character information shown, obtaining a first dubbing audio of a first user, and associating the first dubbing audio with the first character information, wherein the first dubbing audio is a dub for a text fragment of the text to be dubbed that is associated with the first character information; and obtaining an aggregated dubbing audio corresponding to the text to be dubbed based on the first dubbing audio associated with the first character information and an obtained second dubbing audio respectively corresponding to at least one piece of second character information associated with the text to be dubbed, and showing a first audio identifier corresponding to the aggregated dubbing audio, wherein the first audio identifier indicates character information corresponding to each dubbing audio in the aggregated dubbing audio.

In an embodiment, the first audio identifier comprises audio playing identifiers of dubbing audios corresponding to a plurality of text fragments; and an arrangement order of the audio playing identifiers in the first audio identifier is related to a contextual order of the plurality of text fragments in the text to be dubbed.

In an embodiment, the dubbing interaction method further comprises: obtaining the second dubbing audio respectively corresponding to the at least one piece of second character information associated with the text to be dubbed, comprising: posting dubbing dynamic information of the first user, wherein the dubbing dynamic information comprises the first dubbing audio associated with the text to be dubbed; and obtaining the second dubbing audio corresponding to the at least one piece of second character information fed back by a second user based on the dubbing dynamic information.

In an embodiment, the dubbing interaction method further comprises: obtaining the second dubbing audio respectively corresponding to the at least one piece of second character information associated with the text to be dubbed, comprising: in response to an intelligent dubbing request, obtaining the second dubbing audio generated based on artificial intelligence and respectively corresponding to the at least one piece of second character information associated with the text to be dubbed.

In an embodiment, showing the plurality of pieces of character information associated with the text to be dubbed comprises: in response to a dubbing triggering operation for the text to be dubbed, showing a chat interface of a target virtual room, wherein the plurality of pieces of character information associated with the text to be dubbed are shown in the chat interface.

In an embodiment, after obtaining the first dubbing audio, the dubbing interaction method further comprises: in response to obtaining a target dialect type selected by the first user, converting the first dubbing audio to a dubbing audio of the target dialect type; or showing a recommended dialect type according to geographical location information of the first user obtained under authorization or geographical location information contained in the text to be dubbed; and converting the first dubbing audio to a dubbing audio of the recommended dialect type in response to a confirmation operation for the recommended dialect type.

Embodiment of the present disclosure further provide a computer-readable storage medium, storing a computer program which, when run by a processor, causes a dubbing interaction method to be performed, and the dubbing interaction method comprises: showing a plurality of pieces of character information associated with a text to be dubbed; in response to a selection operation for first character information shown, obtaining a first dubbing audio of a first user, and associating the first dubbing audio with the first character information, wherein the first dubbing audio is a dub for a text fragment of the text to be dubbed that is associated with the first character information; and obtaining an aggregated dubbing audio corresponding to the text to be dubbed based on the first dubbing audio associated with the first character information and an obtained second dubbing audio respectively corresponding to at least one piece of second character information associated with the text to be dubbed, and showing a first audio identifier corresponding to the aggregated dubbing audio, wherein the first audio identifier indicates character information corresponding to each dubbing audio in the aggregated dubbing audio.

BRIEF DESCRIPTION OF DRAWINGS

To describe the technical solutions in the embodiments of the present disclosure or in the prior art more clearly, the accompanying drawings required in the description of the embodiments or the prior art will be described briefly below. The accompanying drawings, which are hereby incorporated in and constitute a part of the present description, illustrate embodiments of the present disclosure, and together with the description, serve to explain the principles of the embodiments of the present disclosure. It should be understood that these drawings are merely intended to describe rather than limit the technical solutions of the embodiments of the present disclosure. Other accompanying drawings can also be derived from these drawings by those ordinarily skilled in the art without creative efforts.

DETAILED DESCRIPTION

Figure 1:
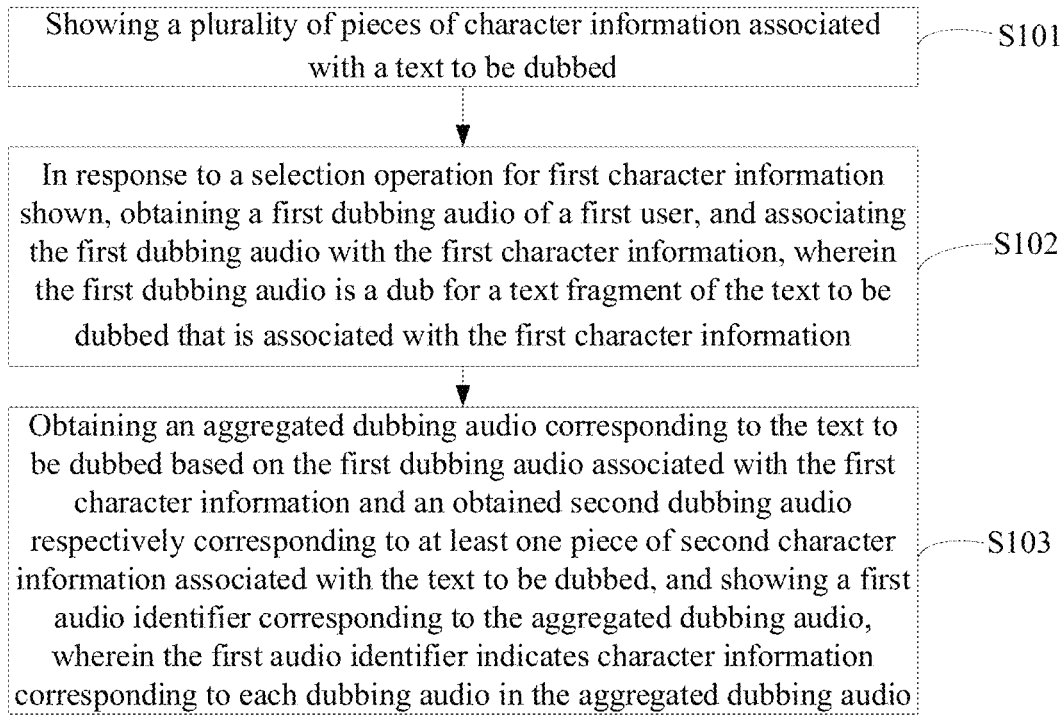
FIG. 1 illustrates a flowchart of a dubbing interaction method provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Usually, the components of the embodiments of the present disclosure as described and illustrated herein could be arranged and designed in a wide variety of different configurations. Thus, the following detailed description of the embodiments of the disclosure is not intended to limit the protection scope of the disclosure, but is merely representative of optional embodiments of the disclosure. Based on the embodiments of the present disclosure, all other embodiments obtained by those skilled in the art without making creative labor belong to the scope of protection of the present disclosure.

In a book reading application, if a user wants to dub for a content of interest, the user may use a dubbing function provided in the application. Generally, in the dubbing function provided by the application, it only allows the user herself/himself to dub for a selected character without interaction, and thus cannot provide good dubbing and interactive experience.

Based on this, the present disclosure provides a dubbing interaction method comprising: showing a plurality of pieces of character information associated with a text to be dubbed; in response to a selection operation for first character information shown, obtaining a first dubbing audio of a first user, and associating the first dubbing audio with the first character information, wherein the first dubbing audio is a dub for a text fragment of the text to be dubbed that is associated with the first character information; and obtaining an aggregated dubbing audio corresponding to the text to be dubbed based on the first dubbing audio associated with the first character information and an obtained second dubbing audio respectively corresponding to at least one piece of second character information associated with the text to be dubbed, and showing a first audio identifier corresponding to the aggregated dubbing audio, wherein the first audio identifier indicates character information corresponding to each dubbing audio in the aggregated dubbing audio.

The dubbing interaction method provided by an embodiment of the present disclosure may obtain an aggregated dubbing audio based on a first dubbing audio of a first user dubbing for a first character and a second dubbing audio dubbed for a second character. The dubbing interaction method can realize not only multi-user dubbing but also multi-character combined dubbing, which realizes a dubbing interaction function, and may further enhance the dubbing and reading experience of users while enriching dubbing manners for the users.

The shortcomings of the above solution are outcomes of practices and careful studies conducted by the inventors. Therefore, the process of discovering the above problems and the solutions proposed below in the present disclosure for the above problems should be regarded as contributions of the inventors to the present disclosure.

It should be noted that similar reference signs and letters represent similar items in the drawings below. Therefore, once an item is defined in one drawing, it does not need to be further defined and described in subsequent drawings.

It will be understood that before using the technical solutions disclosed in various embodiments of the present disclosure, a user should be notified of a type, a range of use, a usage scenario, etc. of personal information involved in the present disclosure in an appropriate manner in accordance with relevant laws and regulations, and these should be authorized by the user.

In order to facilitate the understanding of this embodiment, the dubbing interaction method provided by the embodiment of the present disclosure is introduced in detail first. A performing agent for the dubbing interaction method provided by the embodiment of the present disclosure is generally a computer device having a certain computing power.

The dubbing interaction method provided by the embodiment of the present disclosure is described below.

With reference to FIG. 1, there is shown a flowchart of a dubbing interaction method provided by an embodiment of the present disclosure. The method includes steps S101 to S103.

S101: showing a plurality of pieces of character information associated with a text to be dubbed.

S102: in response to a selection operation for first character information shown, obtaining a first dubbing audio of a first user, and associating the first dubbing audio with the first character information, wherein the first dubbing audio is a dub for a text fragment of the text to be dubbed that is associated with the first character information.

S103: obtaining an aggregated dubbing audio corresponding to the text to be dubbed based on the first dubbing audio associated with the first character information and an obtained second dubbing audio respectively corresponding to at least one piece of second character information associated with the text to be dubbed, and showing a first audio identifier corresponding to the aggregated dubbing audio, wherein the first audio identifier indicates character information corresponding to each dubbing audio in the aggregated dubbing audio.

In the embodiment of the present disclosure, the text to be dubbed may include a complete text content to be dubbed, such as a whole book and a whole script, or may include a part of the complete text content, such as a certain paragraph and a certain chapter in a book or a script. In the case that the text to be dubbed includes part of the complete text content, the text to be dubbed may be a text content of any part, or may be a text content under a target fragment dimension.

In an implementation, the text to be dubbed may be determined according to the following steps: showing a plurality of fragment dimensions associated with a target book, where each of the plurality of fragment dimensions is used to indicate a text fragment in the target book that matches a preset attribute feature; and in response to a target fragment dimension selected by the first user, determining a text in the target book that matches the target fragment dimension as the text to be dubbed.

In the above implementation, the fragment dimensions may include a popularity dimension, a target character dimension, a target plot dimension, a target chapter dimension, etc. The popularity dimension may be a fragment dimension of which a popularity value exceeds a first set threshold. The target character dimension may be a dimension of a target character in the target book. The target character may be any character in the target book, or may be a character having a character popularity exceeding a second set threshold. The target plot dimension may be a dimension of a target plot in the target book. The target plot may be any plot in the target book, or may be a plot having a plot popularity exceeding a third set threshold. The target chapter dimension may be a dimension of a target chapter in the target book. The target chapter may be any chapter in the target book, or may be a chapter having a chapter popularity exceeding a fourth set threshold.

Figure 2:
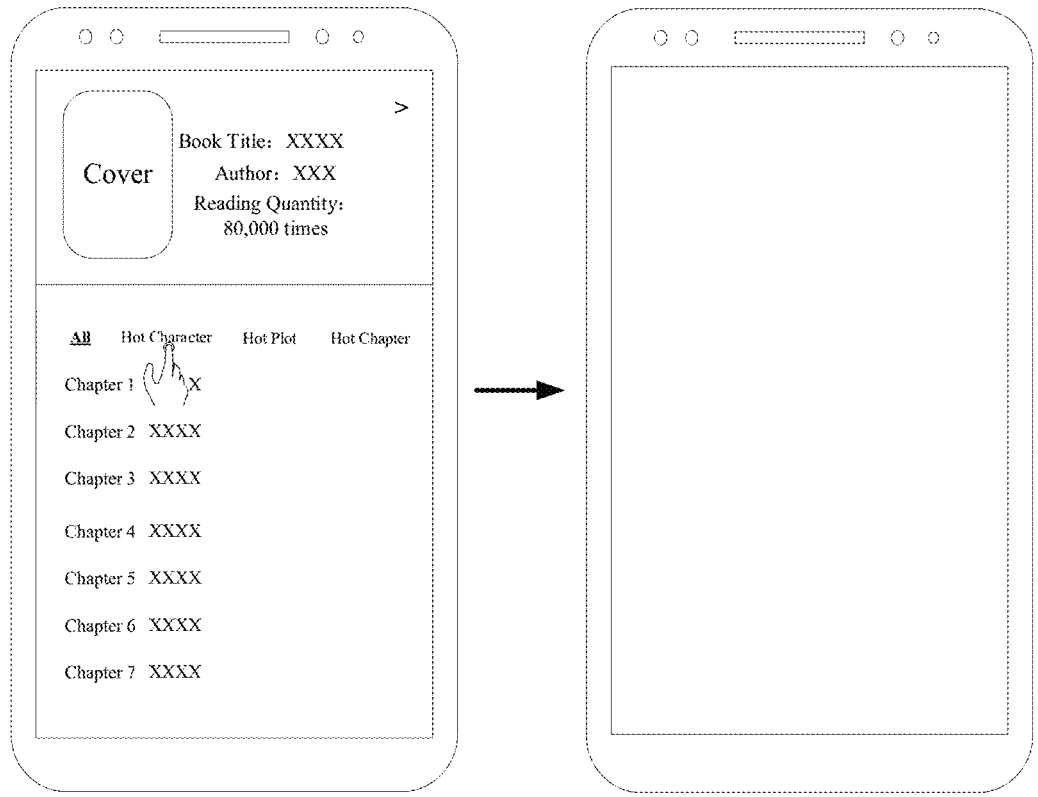
FIG. 2 illustrates a schematic diagram of showing a text to be dubbed provided by an embodiment of the present disclosure.
Figure 3:
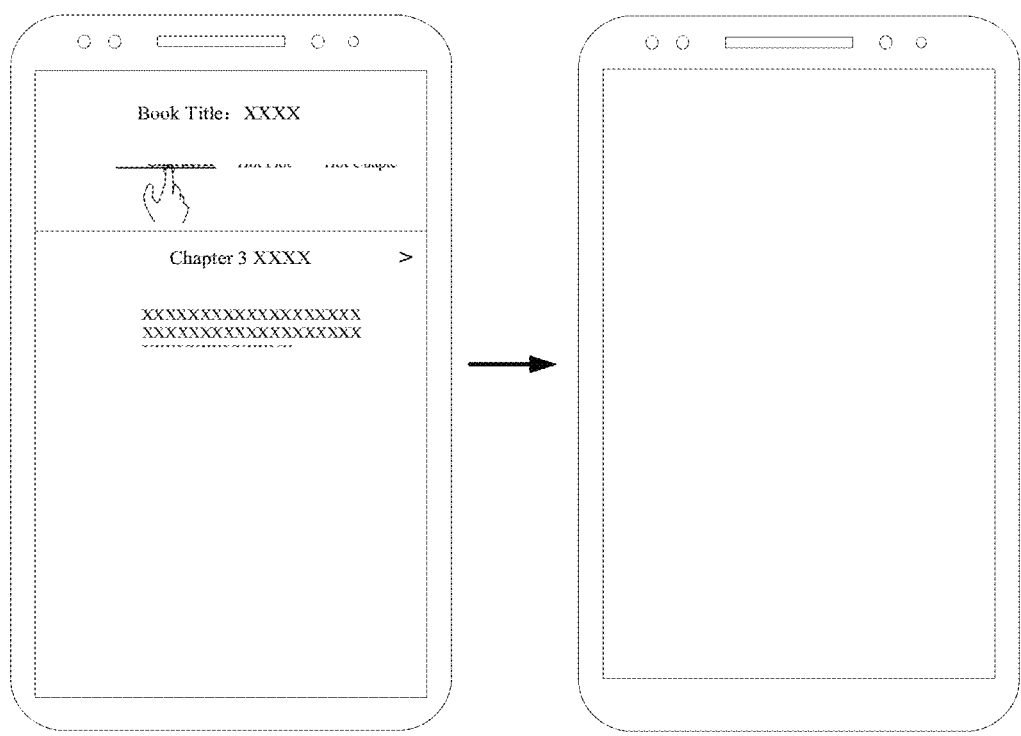
FIG. 3 illustrates another schematic diagram of showing a text to be dubbed provided by an embodiment of the present disclosure.

As shown in FIG. 2, the plurality of fragment dimensions may be shown in a brief introduction page of a book, such as a hot character dimension, a hot plot dimension, and a hot chapter dimension. In response to the target fragment dimension (such as the hot character dimension) selected by the first user, a book content page may be shown, and a text fragment under the target fragment dimension may be shown in the book content page. As shown in FIG. 3, the plurality of fragment dimensions may also be shown in the book content page, and in response to the target fragment dimension (such as the hot character dimension) selected by the first user, a text fragment under the target fragment dimension may be shown in the book content page. The text fragment under the target fragment dimension may be used as the text to be dubbed.

The text to be dubbed may be associated with a plurality of characters, and each character may correspond to a text fragment, such as a monologue content of each character, and a dialogue content of each character with other character.

In an implementation, in response to a dubbing triggering operation for the text to be dubbed, a plurality of pieces of character information associated with the text to be dubbed may be shown.

The dubbing triggering operation may include a dubbing triggering operation for the text to be dubbed shown in a content showing page in the process of browsing the text to be dubbed, or a dubbing triggering operation for the text to be dubbed shown in a content discussion page in the process of participating in a discussion on the text to be dubbed.

Characters indicated by different character information may be different. The shown character information may include, for example, information such as a name, an identifier, and an avatar of the character.

In the embodiment of the present disclosure, the first dubbing audio may be a dub for the text fragment associated with the first character information after the selection operation for the first character information is triggered, or may be a dub that has been made by the first user in advance for the text fragment associated with the first character information.

As described above, the text to be dubbed may be associated with a plurality of pieces of character information. The plurality of pieces of character information may include the first character information and at least one piece of second character information. In the embodiment of the present disclosure, the second dubbing audio respectively corresponding to the at least one piece of second character information associated with the text to be dubbed may also be obtained. A character indicated by the second character information may be different from a character indicated by the first character information.

The second dubbing audio may be a dub for a text fragment associated with the second character information. The second dubbing audio may be made by a user, or may be made based on artificial intelligence. The two dubbing manners corresponding to the second dubbing audio are introduced below respectively.

For the second dubbing audio being made by the user, in an implementation, the second dubbing audio may be obtained according to the following steps: posting dubbing dynamic information of the first user, where the dubbing dynamic information includes the first dubbing audio associated with the text to be dubbed; and obtaining the second dubbing audio corresponding to the second character information fed back by a second user based on the dubbing dynamic information.

Here, the dubbing dynamic information may refer to a voice dynamic for posting a dub and may indicate that the first user has made a dub for a text fragment associated with a first character. The dubbing dynamic information may be used for the second user to feed back, after seeing the dubbing dynamic information, a dub for a text fragment associated with the second character information. In an example, after the first user posts the voice dynamic including the first dubbing audio, the second user may feed back the second dubbing audio for the first dubbing audio in the form of a comment.

Figure 4:
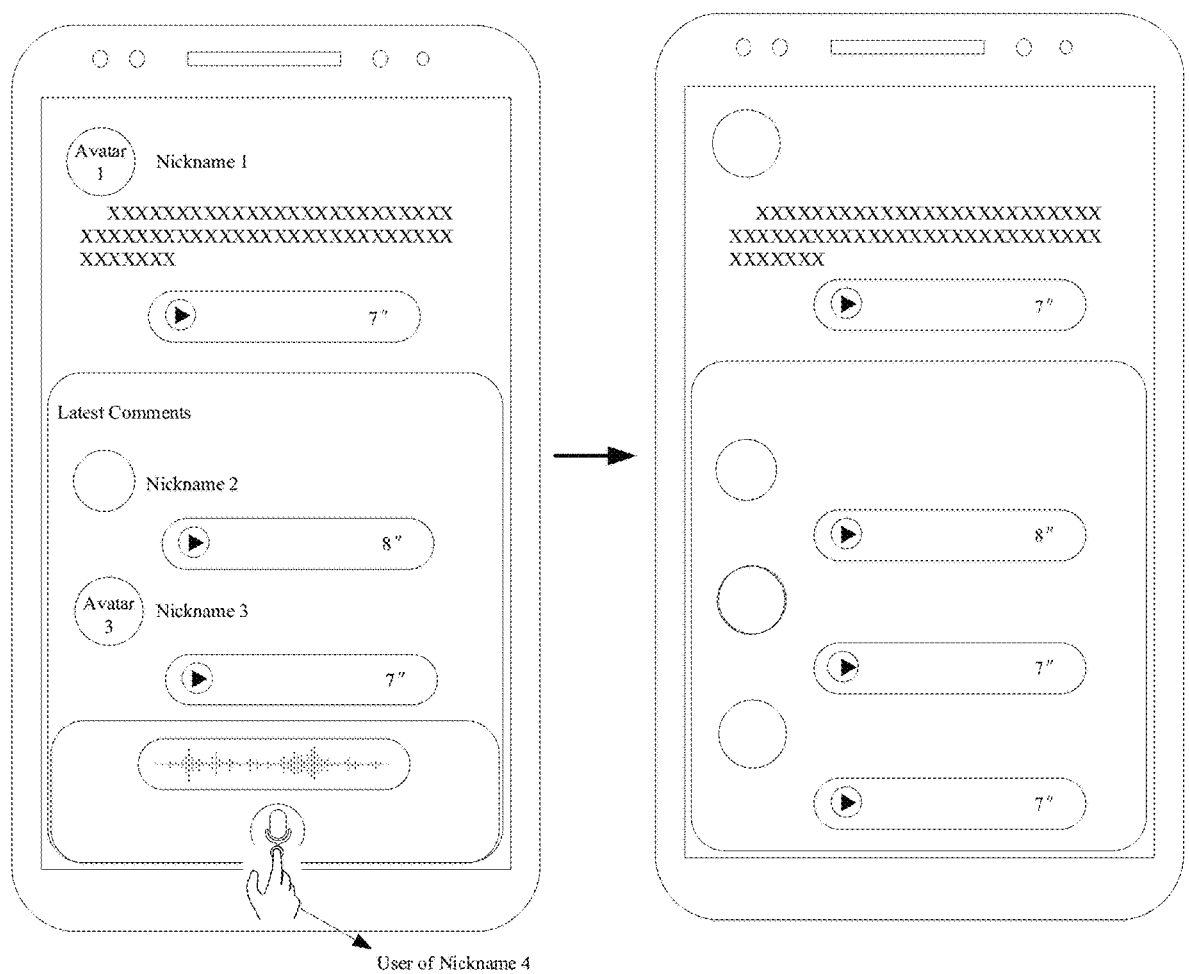
FIG. 4 illustrates a schematic diagram of a second user feeding back a second dubbing audio provided by an embodiment of the present disclosure.

As shown in FIG. 4, a dynamic showing page of a first user shows the dubbing dynamic information posted by the first user, i.e., the dubbing dynamic information posted by the user of "nickname 1". The dubbing dynamic information includes the text to be dubbed and a dubbing audio made by the user of "nickname 1" for character 1 in the text to be dubbed. The second user may feed back the second dubbing audio corresponding to character 2 based on the dubbing dynamic information in comments. For example, after the second user of "nickname 4" may post the dubbing audio for the character 2 after triggering a dubbing button in the dynamic showing page. The dubbing audio posted by the second user may be shown in a comment area of the dynamic showing page. In FIG. 4, after users post dubbing audios for respective selected characters, the dubbing audios corresponding to characters may be arranged sequentially according to posting times. For example, the dubbing audio for character 3 posted by the user of "nickname 2", the dubbing audio for character 4 posted by the user of "nickname 3", and the dubbing audio for character 2 posted by the user of "nickname 4" may be sequentially arranged from top to bottom according to the posting times.

The second dubbing audio respectively corresponding to at least one piece of second character information may be made by the same second user, or may be made by different second users. For different second characters, the resulting second dubbing audios may match voice characteristics of the second characters.

For the second dubbing audio being made based on artificial intelligence, in an implementation, the second dubbing audio may be obtained according to the following step: in response to an intelligent dubbing request, obtaining the second dubbing audio generated based on artificial intelligence and respectively corresponding to the at least one piece of second character information associated with the text to be dubbed.

Here, the second dubbing audio respectively corresponding to the at least one piece of second character information associated with the text to be dubbed may be generated by using a pre-trained model or a text to speech (TTS) technique. For different second character information, the second dubbing audio generated based on artificial intelligence may conform to the voice characteristics of the characters. For a little girl character, the generated second dubbing audio may be a high-pitched pure female voice audio; for an old woman character, the generated second dubbing audio may be a deep and gentle female voice audio.

The intelligent dubbing request may include a first intelligent dubbing request separately made for each piece of second character information, or may include a second intelligent request made for the at least one piece of second character information. Specifically, in one manner, the second dubbing audio generated based on artificial intelligence and corresponding to each piece of second character information may be obtained separately in response to the first intelligent dubbing request separately made for each piece of second character information. In another manner, the second dubbing audio generated based on artificial intelligence and corresponding to the at least one piece of second character information associated with the text to be dubbed may be obtained simultaneously in response to the second intelligent request made for the at least one piece of second character information.

In the foregoing implementation, the first dubbing audio and the second dubbing audio may be generated independently. For example, the first dubbing audio and the second dubbing audio may be obtained in different dubbing scenarios and in different time periods. An implementation may be further provided below in which the first dubbing audio and the second dubbing audio may be obtained by the first user and the second user by group-chat dubbing.

Specifically, dubbing audios respectively corresponding to the plurality of pieces of character information may be obtained by: in response to a dubbing triggering operation for the text to be dubbed, showing a chat interface of a target virtual room, where a plurality of pieces of character information associated with the text to be dubbed are shown in the chat interface; and obtaining the first dubbing audio of the first user for the first character information in the chat interface and the second dubbing audio of the second user for the second character information in the chat interface.

In the above implementation, the dubbing triggering operation for the text to be dubbed may include an operation of creating a virtual room or entering a virtual room. Exemplarily, a control for creating a virtual room and/or a control for entering a virtual room may be shown in a showing page or a discussion page of the text to be dubbed. After the control for creating a virtual room is triggered by the user, a new virtual room may be created, or after the control for entering a virtual room is triggered, the user may enter a virtual room created by other user.

If the dubbing triggering operation includes the operation of creating a virtual room, in one manner, in response to the operation of creating a virtual room for the text to be dubbed, prompt information for creating a virtual room may be shown; in response to receiving an acknowledgment feedback of a virtual room creating user, and other user selected by the virtual room creating user, the chat interface of the created target virtual room may be shown.

If the dubbing triggering operation includes the operation of entering a virtual room, in one manner, in response to the operation of entering a virtual room for the text to be dubbed, after accepting information of a virtual room creating user is received, the chat interface of the target virtual room may be shown.

The chat interface of the target virtual room may show the plurality of pieces of character information associated with the text to be dubbed. The user entering the target virtual room may dub for at least one piece of character information selected in the chat interface.

Figure 5:
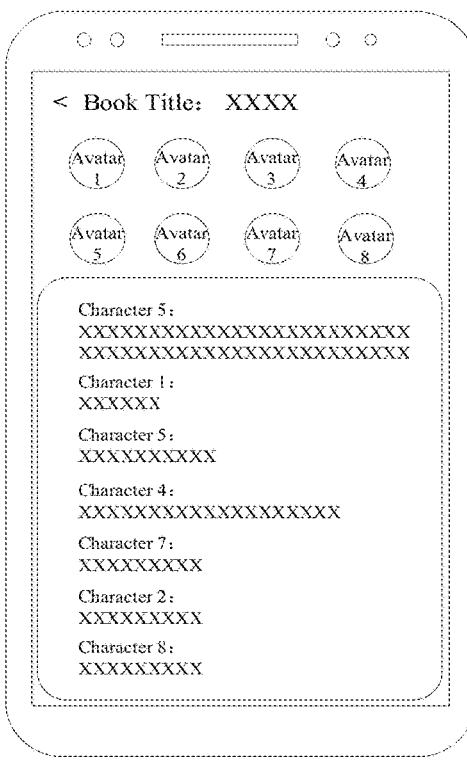
FIG. 5 illustrates a schematic diagram of a plurality of users dubbing in a chat interface of a target virtual room provided by an embodiment of the present disclosure.

FIG. 5 illustrates a schematic diagram of a plurality of users dubbing in a chat interface of a target virtual room. After a plurality of users enter the same target virtual room, the user information (e.g., avatar and name) of each user may be shown in the chat interface, and each user may correspond to at least one character. A content to be dubbed corresponding to each character may be shown in a chat page according to characters. The users may dub for respective characters in the form of a dialogue according to the characters selected by themselves.

Based on dubs of the users in the chat interface, the first dubbing audio of the first user for the first character information and the second dubbing audio of the second user for the second character information may be obtained.

To enrich dubbing effects, in an embodiment of the present disclosure, the obtained first dubbing audio or second dubbing audio may also be converted to a dubbing audio of a target dialect type, allowing for richer and more interesting dubbing language types.

A conversion manner for a dialect type of a dubbing audio is described below by taking the first dubbing audio as an example. In an implementation, after the first dubbing audio is obtained, in response to obtaining a target dialect type selected by the first user, the first dubbing audio is converted to a dubbing type of a target dialect type; or a recommended dialect type is shown according to geographical location information of the first user obtained under authorization or geographical location information contained in the text to be dubbed; and in response to a confirmation operation for the recommended dialect type, the first dubbing audio is converted to a dubbing audio of the recommended dialect type.

In the above implementation, a plurality of dialect types may be shown for selection by the first user. After the first user selects the target dialect type from the plurality of dialect types, the first dubbing audio may be converted to the dubbing type of the target dialect type.

When the text to be dubbed includes the geographical location information, whether the geographical location information is true geographical location information may be determined first, and if yes, a dialect type matching the true geographical location information may be shown. When the true geographical location information includes a plurality of dialect types, the plurality of dialect types included in the true geographical location information may be shown for selection by the first user, or dialect types of the plurality of dialect types included in the true geographical location information that are ranked with respect to the number of users above a preset rank may also be shown for selection by the first user.

The second dubbing audio may also be converted to a dubbing audio of the target dialect type according to the above implementation. When the second dubbing audio is a dub made by a user, a target dialect type may be selected by the second user for the second dubbing audio, and the second dubbing audio may be converted to a dubbing audio of the target dialect type; or, a target dialect type may be selected by other user (e.g., the first user), and the second dubbing audio may be converted to a dubbing audio of the target dialect type. when the second dubbing audio may be a dub made based on artificial intelligence, a target dialect type may be selected by a user (e.g., the first user), and the second dubbing audio may be converted to a dubbing audio of the target dialect type.

In an embodiment of the present disclosure, exemplarily, the aggregated dubbing audio may be obtained by aggregating the dubbing audios respectively corresponding to the plurality of pieces of character information according to a contextual order of the text fragments corresponding to the character information. Further exemplarily, the aggregated dubbing audio may also be obtained by ranking the dubbing audios corresponding to the character information with respect to a preset arrangement order (such as an appearing order and a popularity rank) of the character information.

In an embodiment of the present disclosure, the first audio identifier of the aggregated dubbing audio may be shown at an associated position of the text to be dubbed, e.g., at the end of the text to be dubbed.

In an implementation, the first audio identifier of the aggregated dubbing audio may include audio playing identifiers of dubbing audios corresponding to a plurality of text fragments. An arrangement order of the audio playing identifiers in the first audio identifier is related to a contextual order of the text fragments in the text to be dubbed.

The audio playing identifier may also include corresponding information such as a character name, an audio identifier number, and a playing button.

The audio identifier number may be determined according to the contextual order of the text fragments in the text to be dubbed. The playing button may be configured to play the dubbing audio corresponding to the audio playing identifier after being triggered.

After the aggregated dubbing audio is obtained, the aggregated dubbing audio may be distributed. In an implementation, for at least one audio distribution scenario, an aggregated dubbing audio associated with target theme information in the audio distribution scenario may be determined according to plot or character information associated with the target theme information; and a first audio identifier corresponding to the aggregated dubbing audio is associatively shown under the target theme information as shown, where the first audio identifier is used to show text information and an audio playing identifier corresponding to each dubbing audio of the aggregated dubbing audio in response to a first triggering operation, and the corresponding dubbing audio is played after any audio playing identifier is triggered.

In the above implementation, the aggregated dubbing audio may be distributed to a content showing page or a content discussion page.

The target theme information may include theme information such as a topic discussed by users, a comment given, and a book chapter. The topic discussed by users, the comment given, and the book chapter browsed usually involve information such as a plot and a character in a target book or script. Therefore, in the audio distribution scenario, the aggregated dubbing audio associated with the target theme information may be distributed according to the plot or character information associated with the topic discussed by users, the comment, the book chapter, etc.

The aggregated dubbing audio may be obtained by aggregating the dubbing audios corresponding to the character information. After the first audio identifier corresponding to the aggregated dubbing audio is triggered, the text information and the audio playing identifiers corresponding to the dubbing audios in the aggregated dubbing audio may be shown.

Figure 6:
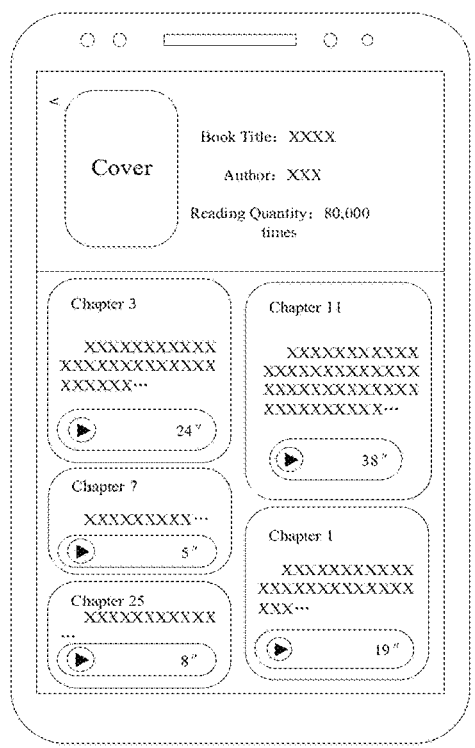
FIG. 6 illustrates a schematic diagram of showing an aggregated dubbing audio provided in an embodiment of the present disclosure.
Figure 7:
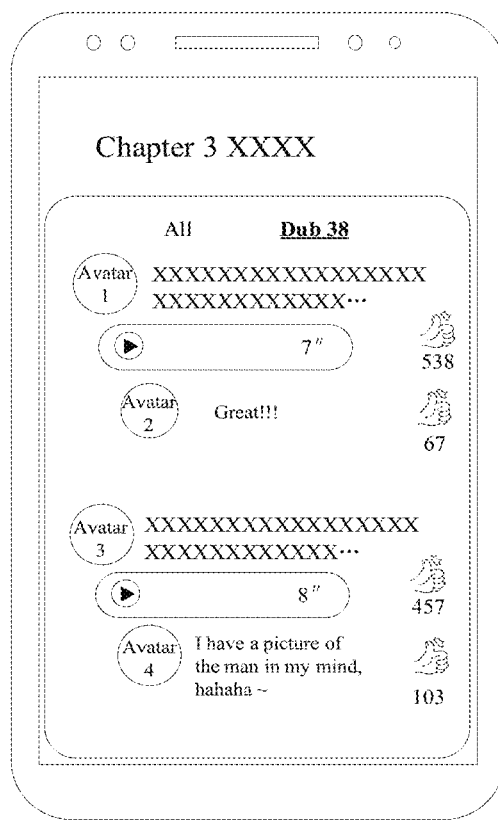
FIG. 7 illustrates a schematic diagram of showing dubbing audios of an aggregated dubbing audio provided in an embodiment of the present disclosure.

FIG. 6 illustrates aggregated dubbing audios associated with a plurality of book chapters in a target book, where the aggregated dubbing audios may be shown in the content showing page of the target book. In each book chapter, a text content of the book chapter and the first audio identifier corresponding to the aggregated dubbing audio are shown. After the first audio identifier is triggered by the user, the text information and the audio playing identifiers corresponding to the dubbing audios may be shown in a dub showing page of the book chapter, as shown in FIG. 7, and the corresponding dubbing audio is played after any audio playing identifier is triggered.

By showing the text information corresponding to the dubbing audios, the user may be allowed to know which part of text information each dubbing audio is made for. The audio playing identifier may be triggered to play the corresponding dubbing audio.

In an embodiment of the present disclosure, viewing dub aggregation information may also be supported. In an implementation, in response to a dub viewing request for a target book, dub aggregation information associated with the target book may be obtained and shown.

Here, the dub aggregation information may include a plurality of fragment dimensions, and a first audio identifier of the aggregated dubbing audio associated with each of the fragment dimensions; the fragment dimension is used to indicate a text fragment in the target book that matches a preset attribute feature; and the plurality of fragment dimensions include at least two of a popularity dimension, a target character dimension, and a target plot dimension.

The first audio identifier is used to successively play the dubbing audios of the aggregated dubbing audio under the fragment dimensions in response to a second triggering operation, or after any audio playing identifier in the first audio identifier is triggered, a dubbing audio of a text fragment corresponding to the audio playing identifier is played.

The plurality of fragment dimensions may be preset. The description of the plurality of fragment dimensions may be as shown as above, which will not be described redundantly here.

It will be appreciated by those skilled in the art that in the method described above, the order of writing the steps does not mean a strict performing order, which imposes no any limitation on the implementation process. The specific order of performing the steps should be determined by the functions thereof and a possible internal logic.

According to the same inventive concept, an embodiment of the present disclosure further provides a dubbing interaction method corresponding to an dubbing interaction apparatus. Since the principle of the apparatus to solve the problem in the embodiments of the present disclosure is the same as that of the dubbing interaction method in the embodiments of the present disclosure, the implementation of the apparatus may refer to the implementation of the method, and repetitions may not be described herein.

Figure 8:
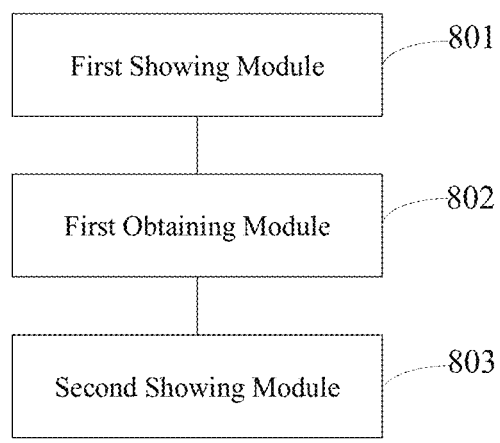
FIG. 8 illustrates a structural schematic diagram of an dubbing interaction apparatus provided by an embodiment of the present disclosure.

With reference to FIG. 8, there is illustrated a schematic diagram of an architecture of a dubbing interaction apparatus provided by an embodiment of the present disclosure. The apparatus includes: a first showing module 801 configured to show a plurality of pieces of character information associated with a text to be dubbed; a first obtaining module 802 configured to, in response to a selection operation for first character information shown, obtain a first dubbing audio of a first user, and associate the first dubbing audio with the first character information, where the first dubbing audio is a dub for a text fragment of the text to be dubbed that is associated with the first character information; and a second showing module 803 configured to obtain an aggregated dubbing audio corresponding to the text to be dubbed based on the first dubbing audio associated with the first character information and an obtained second dubbing audio respectively corresponding to at least one piece of second character information associated with the text to be dubbed, and show a first audio identifier corresponding to the aggregated dubbing audio, where the first audio identifier indicates character information corresponding to each dubbing audio in the aggregated dubbing audio.

In an optional implementation, the first audio identifier includes audio playing identifiers of dubbing audios corresponding to a plurality of text fragments; and an arrangement order of the audio playing identifiers in the first audio identifier is related to a contextual order of the text fragments in the text to be dubbed.

In an optional implementation, the apparatus further includes a second obtaining module configured to obtain the second dubbing audio respectively corresponding to the at least one piece of second character information associated with the text to be dubbed. The second obtaining module is specifically configured to: post dubbing dynamic information of the first user, where the dubbing dynamic information includes the first dubbing audio associated with the text to be dubbed; and obtain the second dubbing audio corresponding to the second character information fed back by a second user based on the dubbing dynamic information.

In an optional implementation, the apparatus further includes a third obtaining module configured to obtain the second dubbing audio respectively corresponding to the at least one piece of second character information associated with the text to be dubbed. The third obtaining module is specifically configured to: in response to an intelligent dubbing request, obtain the second dubbing audio generated based on artificial intelligence and respectively corresponding to the at least one piece of second character information associated with the text to be dubbed.

In an optional implementation, the apparatus further includes a fourth obtaining module configured to obtain dubbing audios respectively corresponding to the plurality of pieces of character information. The fourth obtaining module is specifically configured to: in response to a dubbing triggering operation for the text to be dubbed, show a chat interface of a target virtual room, where the plurality of pieces of character information associated with the text to be dubbed are shown in the chat interface; and obtain the first dubbing audio of the first user for the first character information in the chat interface and the second dubbing audio of a second user for the second character information in the chat interface.

In an optional implementation, the apparatus further includes a conversion module configured to: in response to obtaining a target dialect type selected by the first user, convert the first dubbing audio to a dubbing audio of the target dialect type; or show a recommended dialect type according to geographical location information of the first user obtained under authorization or geographical location information contained in the text to be dubbed; and in response to a confirmation operation for the recommended dialect type, convert the first dubbing audio to a dubbing audio of the recommended dialect type.

In an optional implementation, the apparatus further includes a first determination module configured to: for at least one audio distribution scenario, determine an aggregated dubbing audio associated with target theme information in the audio distribution scenario according to plot or character information associated with the target theme information; and a third showing module configured to associatively show a first audio identifier corresponding to the aggregated dubbing audio under the target theme information shown, where the first audio identifier is used to show text information and an audio playing identifier corresponding to each dubbing audio of the aggregated dubbing audio in response to a first triggering operation, and the corresponding dubbing audio is played after any audio playing identifier is triggered.

In an optional implementation, the apparatus further includes a second determination module configured to determine the text to be dubbed. The second determination module is specifically configured to: show a plurality of fragment dimensions associated with a target book, where the fragment dimension is used to indicate a text fragment in the target book that matches a preset attribute feature; and in response to a target fragment dimension selected by the first user, use a text in the target book that matches the target fragment dimension as the text to be dubbed.

In an optional implementation, the apparatus further includes a fifth obtaining module configured to: in response to a dub viewing request for a target book, obtain and show dub aggregation information associated with the target book, where the dub aggregation information includes a plurality of fragment dimensions, and a first audio identifier of the aggregated dubbing audio associated with each of the fragment dimensions; the fragment dimensions are used to indicate text fragments in the target book that match a preset attribute feature; the plurality of fragment dimensions include several of a popularity dimension, a target character dimension, and a target plot dimension; and where the first audio identifier is used to successively play the dubbing audios of the aggregated dubbing audio under the fragment dimensions in response to a second triggering operation, or after any audio playing identifier in the first audio identifier is triggered, a dubbing audio of a text fragment corresponding to the audio playing identifier is played.

Regarding the descriptions of the processing flow of each module in the apparatus and an interactive flow between the modules, a reference may be made to the related descriptions in the above method embodiments, which will not be described in detail here.

Figure 9:
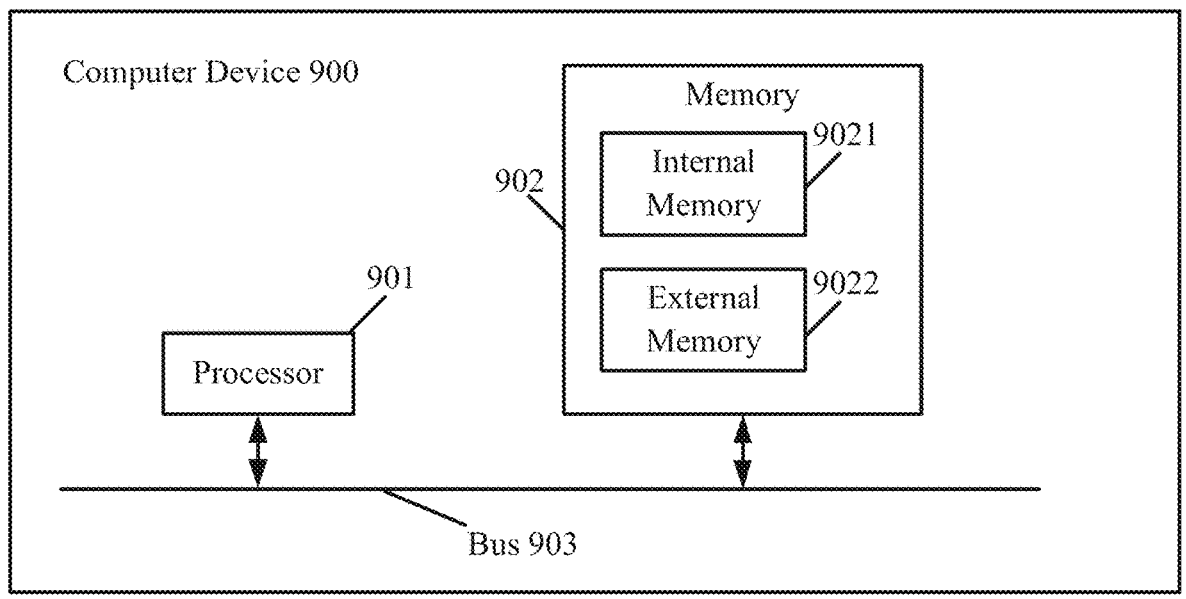
FIG. 9 illustrates a schematic diagram of a computer device provided by an embodiment of the present disclosure.

Based on the same technical concept, an embodiment of the present disclosure further provides a computer device. With reference to FIG. 9, there is shown a structural schematic diagram of a computer device 900 provided by an embodiment of the present disclosure, including a processor 901, a memory 902, and a bus 903. The memory 902 is configured to store executable instructions, and includes an internal memory 9021 and an external memory 9022. The internal memory 9021 mentioned here is also referred to as an internal memory for temporarily storing operational data in the processor 901 and data exchanged with the external memory 9022 such as a hard disk. The processor 901 exchanges data with the external memory 9022 through the internal memory 9021. When the computer device 900 is running, the processor 901 communicates with the memory 902 by the bus 903.

An embodiment of the present disclosure further provides a computer-readable storage medium. The computer-readable storage medium stores a computer program. The computer program, when run by a processor, causes implementing the dubbing interaction method in the above method embodiments. The storage medium may be a volatile or nonvolatile computer-readable storage medium.

An embodiment of the present disclosure further provides a computer program product carrying a program code. Instructions included in the program code may be used to perform the steps of the dubbing interaction method in the above embodiments. For details, a reference may be made to the above method embodiments, which will not be described here redundantly.

The computer program product may be implemented specifically by hardware, software, or a combination thereof. In one optional embodiment, the computer program product is embodied as a computer storage medium. In another optional embodiment, the computer program product is embodied as a software product, e.g., a software development kit (SDK) and the like.

A person skilled in the art can clearly understand that, for convenience and brevity of description, a reference may be made to corresponding processes in the foregoing method embodiments for the specific working process of the apparatus described above, which will not be described here redundantly. In several embodiments provided in the present disclosure, it should be understood that the disclosed apparatus and method may be implemented in other manners. The apparatus embodiments described above are merely schematic. For example, the unit division is merely logical function division and may be another division in actual implementation. For another example, a plurality of units or components may be combined, or some features may be ignored or not performed. In addition, the displayed or discussed mutual couplings or direct couplings or communication connections may be implemented through some communication interfaces. The indirect couplings or communication connections between the apparatuses or units may be implemented in electrical, mechanical, or other forms.

The units described as separate parts may or may not be physically separate. Parts shown as units may or may not be physical units, which may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

If implemented in a form of a software functional unit and sold or used as a stand-alone product, functions may be stored in a nonvolatile computer-readable storage medium executable by a processor. Based on such understanding, the technical solutions of the present disclosure essentially, or a part contributing to the prior art, or part of the technical solutions may be implemented in a form of a software product. The computer software product is stored in a storage medium, and includes several instructions for enabling a computer device (which may be a personal computer, a server, a network device, or the like) to perform all or some steps of the method described in the embodiments of the present disclosure. The storage medium includes any medium capable of storing a program code, such as a USB flash disk, a mobile hard disk, a read-only memory (ROM), a random access memory (RAM), a magnetic disk, or an optical disk.

Finally, it should be noted that the above embodiments are merely specific implementations of the present disclosure, and are used to describe rather than limit the technical solutions of the present disclosure. The protection scope of the present disclosure is not limited thereto. Although the present disclosure is described in detail with reference to the above embodiments, it should be understood that a person of ordinary skill in the art can still make modifications to or readily figure out changes in the technical solutions described in the above embodiments, or make equivalent substitutions on some technical features therein. These modifications, changes, or substitutions do not make the essence of the corresponding technical solutions depart from the spirit and scope of the technical solutions of the embodiments of the present disclosure, and shall all fall within the protection scope of the present disclosure. Therefore, the protection scope of the present disclosure shall be subject to the protection scope of the claims.

The invention claimed is:

1. A dubbing interaction method, comprising:
   showing a plurality of pieces of character information associated with a text to be dubbed;
   in response to a selection operation for first character information shown, obtaining a first dubbing audio of a first user, and associating the first dubbing audio with the first character information, wherein the first dubbing audio is a dub for a text fragment of the text to be dubbed that is associated with the first character information; and
   obtaining an aggregated dubbing audio corresponding to the text to be dubbed based on the first dubbing audio associated with the first character information and an obtained second dubbing audio respectively corresponding to at least one piece of second character information associated with the text to be dubbed, and showing a first audio identifier corresponding to the aggregated dubbing audio, wherein the first audio identifier indicates character information corresponding to each dubbing audio in the aggregated dubbing audio.

2. The dubbing interaction method according to claim 1, wherein the first audio identifier comprises audio playing identifiers of dubbing audios corresponding to a plurality of text fragments; and an arrangement order of the audio playing identifiers in the first audio identifier is related to a contextual order of the plurality of text fragments in the text to be dubbed.

3. The dubbing interaction method according to claim 1, further comprising:
   obtaining the second dubbing audio respectively corresponding to the at least one piece of second character information associated with the text to be dubbed, comprising:
      posting dubbing dynamic information of the first user, wherein the dubbing dynamic information comprises the first dubbing audio associated with the text to be dubbed; and
      obtaining the second dubbing audio corresponding to the at least one piece of second character information fed back by a second user based on the dubbing dynamic information.

4. The dubbing interaction method according to claim 1, further comprising:
   obtaining the second dubbing audio respectively corresponding to the at least one piece of second character information associated with the text to be dubbed, comprising:
      in response to an intelligent dubbing request, obtaining the second dubbing audio generated based on artificial intelligence and respectively corresponding to the at least one piece of second character information associated with the text to be dubbed.

5. The dubbing interaction method according to claim 1, wherein showing the plurality of pieces of character information associated with the text to be dubbed comprises:
   in response to a dubbing triggering operation for the text to be dubbed, showing a chat interface of a target virtual room, wherein the plurality of pieces of character information associated with the text to be dubbed are shown in the chat interface;
   obtaining the first dubbing audio of the first user comprises:
   obtaining the first dubbing audio of the first user for the first character information in the chat interface;

the dubbing interaction method further comprises:
obtaining the second dubbing audio of a second user for the second character information in the chat interface.

6. The dubbing interaction method according to claim 1, after obtaining the first dubbing audio, further comprising:
in response to obtaining a target dialect type selected by the first user, converting the first dubbing audio to a dubbing audio of the target dialect type; or
showing a recommended dialect type according to geographical location information of the first user obtained under authorization or geographical location information contained in the text to be dubbed; and converting the first dubbing audio to a dubbing audio of the recommended dialect type in response to a confirmation operation for the recommended dialect type.

7. The dubbing interaction method according to claim 1, further comprising:
for at least one audio distribution scenario, determining an aggregated dubbing audio associated with target theme information in the audio distribution scenario according to plot or character information associated with the target theme information; and
associatively showing a first audio identifier corresponding to the aggregated dubbing audio under the target theme information shown, wherein the first audio identifier is used to show text information and an audio playing identifier corresponding to each dubbing audio of the aggregated dubbing audio in response to a first triggering operation, and a corresponding dubbing audio is played after any audio playing identifier is triggered.

8. The dubbing interaction method according to claim 1, further comprising:
determining the text to be dubbed, comprising:
showing a plurality of fragment dimensions associated with a target book, wherein each of the plurality of fragment dimensions is used to indicate a text fragment in the target book that matches a preset attribute feature; and
in response to a target fragment dimension being selected by the first user, determining a text in the target book that matches the target fragment dimension as the text to be dubbed.

9. The dubbing interaction method according to claim 1, further comprising:
in response to a dub viewing request for a target book, obtaining and showing dub aggregation information associated with the target book,
wherein the dub aggregation information comprises a plurality of fragment dimensions, and a first audio identifier, associated with each of the plurality of fragment dimensions, of an aggregated dubbing audio; each of the plurality of fragment dimensions is used to indicate a text fragment in the target book that matches a preset attribute feature; the plurality of fragment dimensions comprise at least two of a popularity dimension, a target character dimension, and a target plot dimension; and
wherein the first audio identifier is used to successively play dubbing audios of the aggregated dubbing audio under the plurality of fragment dimensions in response to a second triggering operation, or after any audio playing identifier in the first audio identifier is triggered, a dubbing audio of a text fragment corresponding to the audio playing identifier is played.

10. A computer device, comprising: a processor and a memory, wherein the memory stores machine-readable instructions executable by the processor; the machine-readable instructions, when executed by the processor, cause a dubbing interaction method to be performed, and the dubbing interaction method comprises:
showing a plurality of pieces of character information associated with a text to be dubbed;
in response to a selection operation for first character information shown, obtaining a first dubbing audio of a first user, and associating the first dubbing audio with the first character information, wherein the first dubbing audio is a dub for a text fragment of the text to be dubbed that is associated with the first character information; and
obtaining an aggregated dubbing audio corresponding to the text to be dubbed based on the first dubbing audio associated with the first character information and an obtained second dubbing audio respectively corresponding to at least one piece of second character information associated with the text to be dubbed, and showing a first audio identifier corresponding to the aggregated dubbing audio, wherein the first audio identifier indicates character information corresponding to each dubbing audio in the aggregated dubbing audio.

11. The computer device according to claim 10, wherein the first audio identifier comprises audio playing identifiers of dubbing audios corresponding to a plurality of text fragments; and an arrangement order of the audio playing identifiers in the first audio identifier is related to a contextual order of the plurality of text fragments in the text to be dubbed.

12. The computer device according to claim 10, wherein the dubbing interaction method further comprises:
obtaining the second dubbing audio respectively corresponding to the at least one piece of second character information associated with the text to be dubbed, comprising:
posting dubbing dynamic information of the first user, wherein the dubbing dynamic information comprises the first dubbing audio associated with the text to be dubbed; and
obtaining the second dubbing audio corresponding to the at least one piece of second character information fed back by a second user based on the dubbing dynamic information.

13. The computer device according to claim 10, wherein the dubbing interaction method further comprises:
obtaining the second dubbing audio respectively corresponding to the at least one piece of second character information associated with the text to be dubbed, comprising:
in response to an intelligent dubbing request, obtaining the second dubbing audio generated based on artificial intelligence and respectively corresponding to the at least one piece of second character information associated with the text to be dubbed.

14. The computer device according to claim 10, wherein showing the plurality of pieces of character information associated with the text to be dubbed comprises:
in response to a dubbing triggering operation for the text to be dubbed, showing a chat interface of a target virtual room, wherein the plurality of pieces of character information associated with the text to be dubbed are shown in the chat interface;
obtaining the first dubbing audio of the first user comprises:
obtaining the first dubbing audio of the first user for the first character information in the chat interface;

the dubbing interaction method further comprises:
obtaining the second dubbing audio of a second user for the second character information in the chat interface.

15. The computer device according to claim 10, wherein after obtaining the first dubbing audio, the dubbing interaction method further comprises:
in response to obtaining a target dialect type selected by the first user, converting the first dubbing audio to a dubbing audio of the target dialect type; or
showing a recommended dialect type according to geographical location information of the first user obtained under authorization or geographical location information contained in the text to be dubbed; and converting the first dubbing audio to a dubbing audio of the recommended dialect type in response to a confirmation operation for the recommended dialect type.

16. A non-transitory computer-readable storage medium, storing a computer program which, when run by a processor, causes a dubbing interaction method to be performed, and the dubbing interaction method comprises:
showing a plurality of pieces of character information associated with a text to be dubbed;
in response to a selection operation for first character information shown, obtaining a first dubbing audio of a first user, and associating the first dubbing audio with the first character information, wherein the first dubbing audio is a dub for a text fragment of the text to be dubbed that is associated with the first character information; and
obtaining an aggregated dubbing audio corresponding to the text to be dubbed based on the first dubbing audio associated with the first character information and an obtained second dubbing audio respectively corresponding to at least one piece of second character information associated with the text to be dubbed, and showing a first audio identifier corresponding to the aggregated dubbing audio, wherein the first audio identifier indicates character information corresponding to each dubbing audio in the aggregated dubbing audio.

17. The computer-readable storage medium according to claim 16, wherein the first audio identifier comprises audio playing identifiers of dubbing audios corresponding to a plurality of text fragments; and an arrangement order of the audio playing identifiers in the first audio identifier is related to a contextual order of the plurality of text fragments in the text to be dubbed.

18. The computer-readable storage medium according to claim 16, wherein the dubbing interaction method further comprises:
obtaining the second dubbing audio respectively corresponding to the at least one piece of second character information associated with the text to be dubbed, comprising:
posting dubbing dynamic information of the first user, wherein the dubbing dynamic information comprises the first dubbing audio associated with the text to be dubbed; and
obtaining the second dubbing audio corresponding to the at least one piece of second character information fed back by a second user based on the dubbing dynamic information.

19. The computer-readable storage medium according to claim 16, wherein the dubbing interaction method further comprises:
obtaining the second dubbing audio respectively corresponding to the at least one piece of second character information associated with the text to be dubbed, comprising:
in response to an intelligent dubbing request, obtaining the second dubbing audio generated based on artificial intelligence and respectively corresponding to the at least one piece of second character information associated with the text to be dubbed.

20. The computer-readable storage medium according to claim 16, wherein showing the plurality of pieces of character information associated with the text to be dubbed comprises:
in response to a dubbing triggering operation for the text to be dubbed, showing a chat interface of a target virtual room, wherein the plurality of pieces of character information associated with the text to be dubbed are shown in the chat interface;
obtaining the first dubbing audio of the first user comprises:
obtaining the first dubbing audio of the first user for the first character information in the chat interface; and
the dubbing interaction method further comprises:
obtaining the second dubbing audio of a second user for the second character information in the chat interface.

* * * * *